United States Patent
Griffis et al.

(10) Patent No.: US 11,434,772 B2
(45) Date of Patent: Sep. 6, 2022

(54) TURBINE NOZZLE AND METHOD OF MANUFACTURE

(71) Applicant: General Electric Company, Schenectady, NY (US)

(72) Inventors: Clay Thomas Griffis, Greenville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/036,859

(22) Filed: Sep. 29, 2020

(65) Prior Publication Data

US 2022/0098992 A1    Mar. 31, 2022

(51) Int. Cl.
*F01D 9/02* (2006.01)
*F01D 5/18* (2006.01)
(Continued)

(52) U.S. Cl.
CPC .............. *F01D 9/02* (2013.01); *B22F 5/04* (2013.01); *B22F 10/00* (2021.01); *F01D 5/18* (2013.01);
(Continued)

(58) Field of Classification Search
CPC ..... F01D 9/02; F01D 5/14; F01D 5/18; B22F 10/00; B22F 10/40; B22F 10/20; B22F 5/04; B22F 2003/1042; B22F 2003/247; B22F 2203/11; B22F 2202/11; B33Y 10/00; B33Y 80/00; B33Y 64/153; F05D 2230/31; F05D 2240/128; F05D 2240/35; F05D 2260/22141

See application file for complete search history.

(56) References Cited

U.S. PATENT DOCUMENTS

| 10,220,576 B2 | 3/2019 | Szwedka |
| 2017/0276363 A1 | 9/2017 | Berry et al. |

(Continued)

FOREIGN PATENT DOCUMENTS

| EP | 3536445 A1 | 9/2019 |
| EP | 3695924 A1 | 8/2020 |

(Continued)

OTHER PUBLICATIONS

European Search Report Corresponding to Application No. 21187044 dated Oct. 27, 2021.

*Primary Examiner* — Eric J Zamora Alvarez
(74) *Attorney, Agent, or Firm* — Dority & Manning, P.A.

(57) ABSTRACT

Methods of fabricating a turbomachine component and turbomachine components are provided. The method includes irradiating a layer of powder in a powder bed to form a fused region. The powder is disposed on a build plate. The method further includes a step of providing a subsequent layer of powder over the powder bed by passing a recoater arm over the powder bed from a first side of the powder bed. The method further includes repeating the irradiating and providing steps until a turbine nozzle assembly is formed on the build plate. The turbine nozzle assembly includes the turbine nozzle and a plurality of heat fins disposed within the turbine nozzle. The plurality of heat fins transfer heat away from a thermally sensitive portion of the turbine nozzle.

18 Claims, 7 Drawing Sheets

(51) Int. Cl.
  *B22F 3/10*     (2006.01)
  *B33Y 80/00*    (2015.01)
  *B33Y 10/00*    (2015.01)
  *B22F 10/28*    (2021.01)
  *B22F 10/40*    (2021.01)
  *B22F 10/00*    (2021.01)
  *B22F 5/04*     (2006.01)

(52) U.S. Cl.
  CPC ... *B22F 2003/1042* (2013.01); *B22F 2202/11* (2013.01); *B33Y 10/00* (2014.12); *B33Y 80/00* (2014.12); *F05D 2230/31* (2013.01); *F05D 2240/128* (2013.01); *F05D 2240/35* (2013.01)

(56)            References Cited

U.S. PATENT DOCUMENTS

2018/0111334 A1\*  4/2018  Gold ................ B29C 64/153
2018/0326495 A1   11/2018  Dreano
2019/0047222 A1    2/2019  Torrealba et al.
2019/0154345 A1    5/2019  Martinez et al.
2020/0182069 A1\*  6/2020  Spangler ............ F01D 9/041

FOREIGN PATENT DOCUMENTS

WO     WO2019/050518 A1     3/2019
WO     WO2019/186603 A1    10/2019

\* cited by examiner

TURBINE NOZZLE AND METHOD OF MANUFACTURE

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD

The present disclosure relates generally to turbine nozzles. In particular, the present disclosure relates to an improved structure and method for fabricating a turbine nozzle.

BACKGROUND

Turbomachines are widely utilized in fields such as power generation. For example, a conventional gas turbine system includes a compressor section, a combustor section, and at least one turbine section. The compressor section is configured to compress air as the air flows through the compressor section. The air is then directed from the compressor section to the combustor section, where it is mixed with fuel and combusted, generating a hot gas flow. The hot gas flow is provided to the turbine section, which extracts energy from the hot gas flow to power the compressor, an electrical generator, and/or other various loads. Due to the complex shapes and internal geometries of many turbomachine components, an additive manufacturing process may be utilized in order to properly fabricate the components within the tight design tolerances. For example, in a typical turbomachine, one or more rotor blades, shrouds, airfoils, fuel nozzles, and/or combustion components or subcomponents may be manufactured using an additive manufacturing process.

Additive manufacturing processes generally involve the buildup of one or more materials to make a net or near net shape (NNS) object, in contrast to subtractive manufacturing methods. Though "additive manufacturing" is an industry standard term, additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model. A particular type of additive manufacturing process uses an energy beam, for example, an electron beam or electromagnetic radiation such as a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable additive manufacturing process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of additive manufacturing processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material.

However, during laser sintering/melting processes, a three-dimensional object, such as one or more of the turbomachine components described above, is subject to numerous thermal stresses due to the heat experienced through the melting and/or sintering of the material. These thermal stresses have been shown to cause various deformations and/or distortions to the turbomachine component. Accordingly, there is a need for an improved method of additively manufacturing a turbomachine component that advantageously minimizes or completely eliminates distortions in the turbomachine component caused by thermal stress experienced during the additive manufacturing process.

BRIEF DESCRIPTION

Aspects and advantages of the methods of fabricating a turbomachine component and turbomachine components in accordance with the present disclosure will be set forth in part in the following description, or may be obvious from the description, or may be learned through practice of the technology.

In accordance with one embodiment, a method of fabricating a turbine nozzle for a turbomachine using an additive manufacturing system is provided. The method includes irradiating a layer of powder in a powder bed to form a fused region. The powder is disposed on a build plate. The method further includes a step of providing a subsequent layer of powder over the powder bed by passing a recoater arm over the powder bed from a first side of the powder bed. The method further includes repeating the irradiating and providing steps until a turbine nozzle assembly is formed on the build plate. The turbine nozzle assembly includes the turbine nozzle and a plurality of heat fins disposed within the turbine nozzle. The plurality of heat fins transfer heat away from a thermally sensitive portion of the turbine nozzle.

In accordance with another embodiment, a turbomachine component produced on a build plate by an additive manufacturing process is provided. The turbomachine component includes an airfoil and a plurality of heat fins. The airfoil extends between a forward end fused to the build plate and a trailing edge. The airfoil includes an outer liner segment, an inner liner segment, a pressure side wall, and a suction side wall. The outer liner segment and the inner liner segment are oppositely disposed from one another. The suction side wall and the pressure side wall extend between the forward end and the trailing edge and between the outer liner segment and the inner liner segment. The plurality of heat fins are configured to transfer heat away from a thermally sensitive portion of the airfoil during the additive manufacturing process.

These and other features, aspects and advantages of the present methods of fabricating a turbomachine component and turbomachine components will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods of fabricating a turbomachine component and turbomachine components, including the best mode of making and using the present systems and methods, directed to one of ordinary skill in the art, is set forth in the specification, which makes reference to the appended figures, in which.

DETAILED DESCRIPTION

Figure 1:
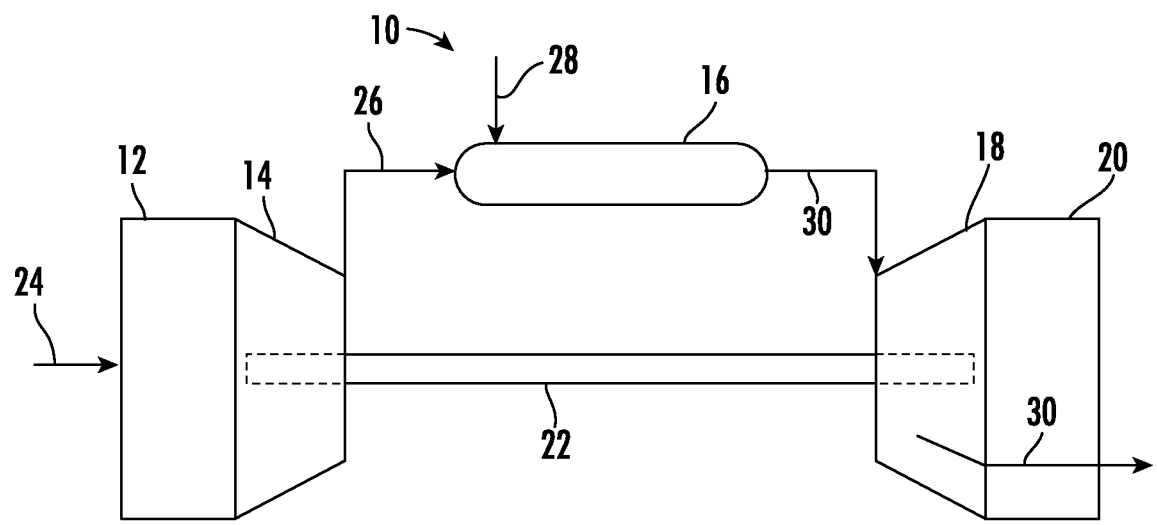
FIG. 1 is a schematic illustration of a turbomachine, in accordance with embodiments of the present disclosure.

Reference now will be made in detail to embodiments of the present assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As described below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes an inlet section 12, a compressor 14 disposed downstream of the inlet section 12, a combustion section 16 disposed downstream of the compressor 14, a turbine 18 disposed downstream of the combustion section 16, and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes, such as to power the compressor 14 and/or to generate electricity. The combustion gases 30 exiting the turbine 18 may then be exhausted from the gas turbine 10 via the exhaust section 20.

Figure 2:
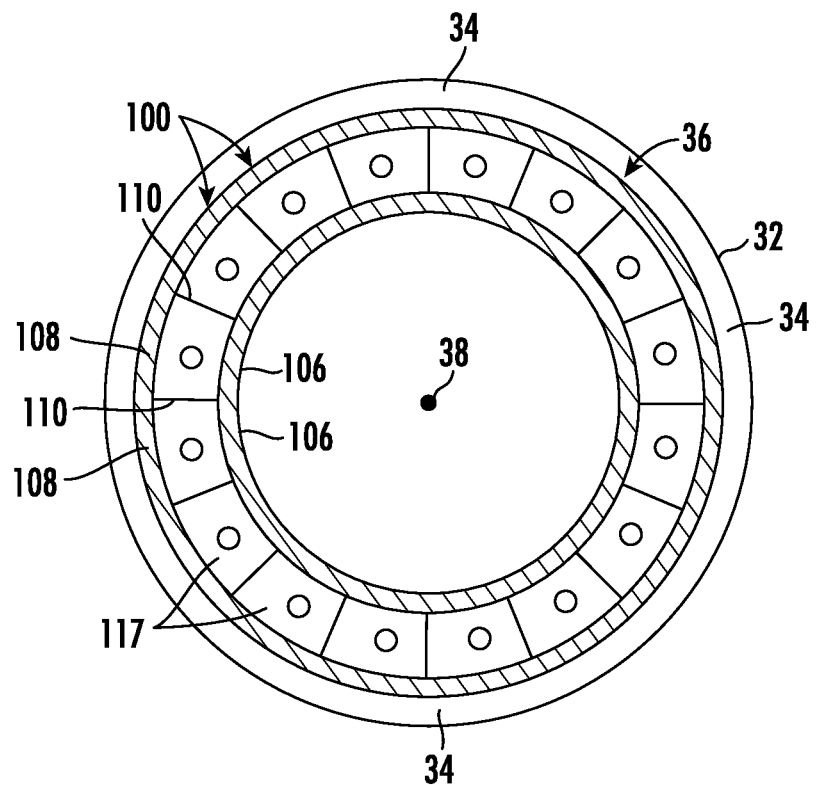
FIG. 2 is an upstream view of an exemplary combustion section of a turbomachine, in accordance with embodiments of the present disclosure.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high-pressure plenum 34 that at least partially surrounds various components of the combustor 16. The high-pressure plenum 34 may be in fluid communication with the compressor 14 (FIG. 1) so as to receive the compressed air 26 therefrom. In various embodiments, as shown in FIG. 2, the combustion section 16 includes a segmented annular combustion system 36 that includes a number of combustors or integrated combustor nozzles 100 arranged circumferentially around an axial centerline 38 of the gas turbine 10, which may be coincident with the gas turbine shaft 22.

Figure 3:
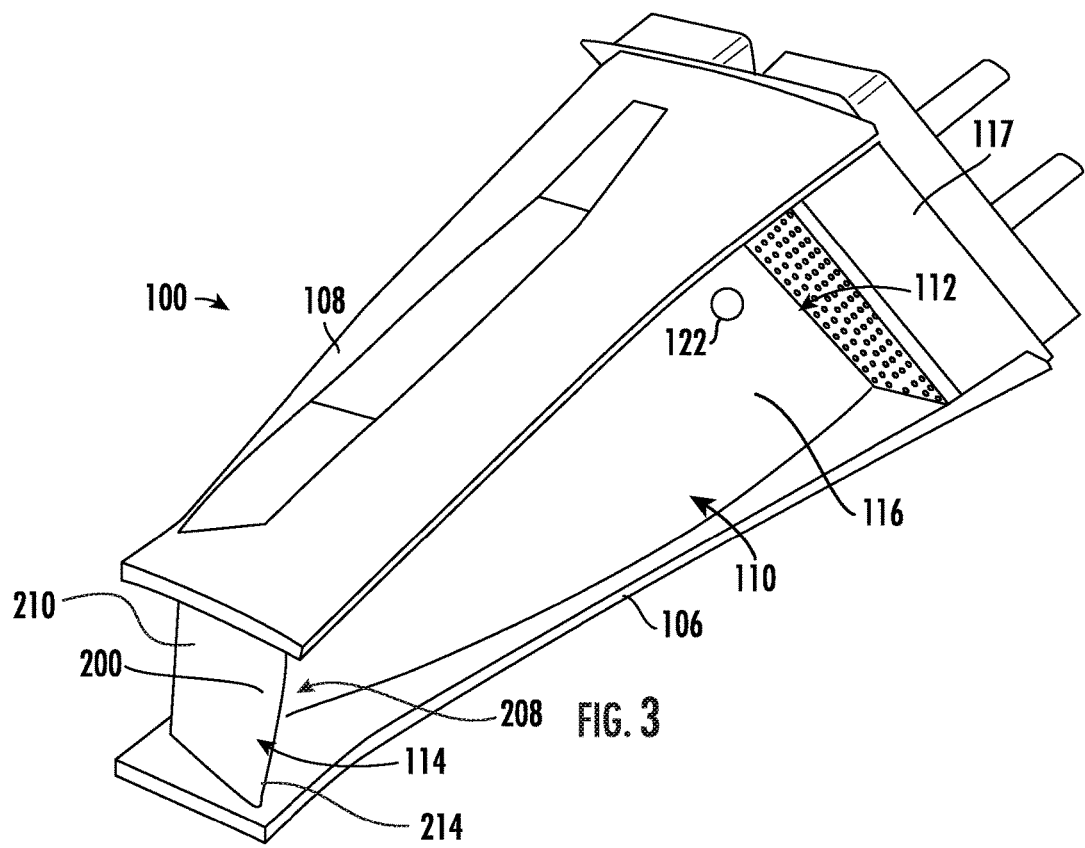
FIG. 3 is a perspective view of an integrated combustor nozzle, as viewed from a first side, in accordance with embodiments of the present disclosure.
Figure 4:
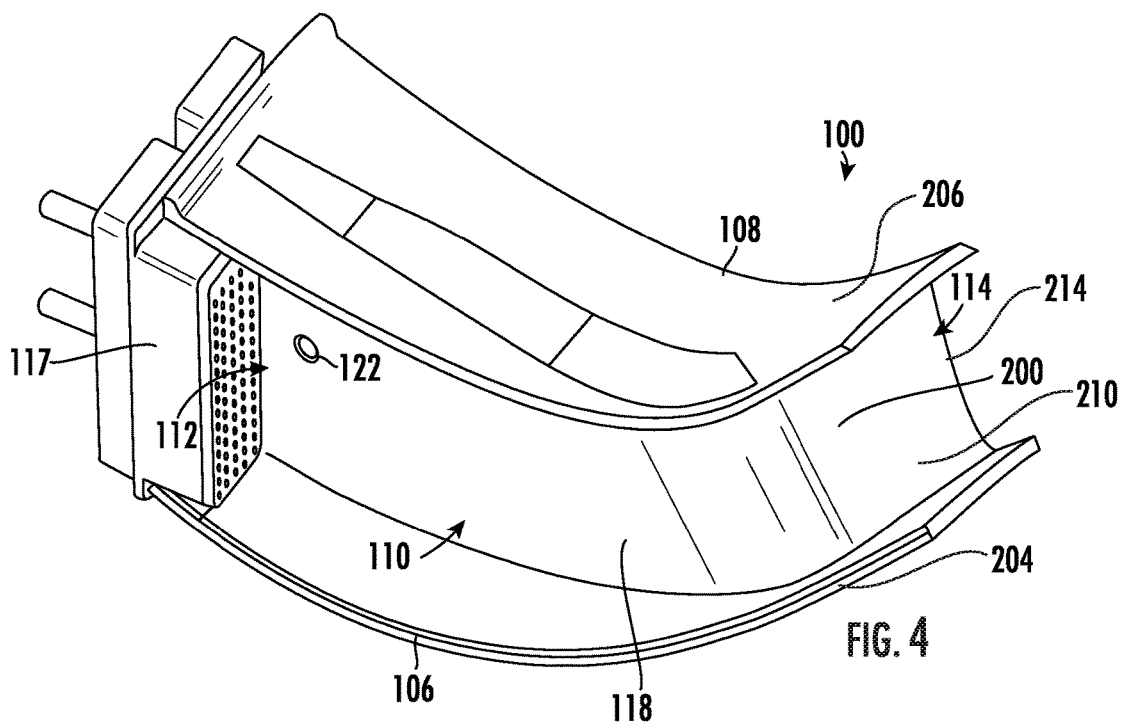
FIG. 4 is a perspective view of an integrated combustor nozzle, as viewed from a second side, in accordance with embodiments of the present disclosure.

FIG. 3 provides a perspective view of an integrated combustor nozzle 100, as viewed from a first side. Similarly, FIG. 4 provides a perspective view of an integrated combustor nozzle 100, as viewed from a second side, in accordance with embodiments of the present disclosure. As shown collectively in FIGS. 2, 3 and 4, the segmented annular combustion system 36 includes a plurality of integrated combustor nozzles 100. As described further herein, each combustor nozzle 100 includes a first side wall 116 and a second side wall 118. In particular embodiments, the first side wall is a pressure side wall, while the second side wall is a suction side wall, based on the integration of the side walls with corresponding pressure and suction sides of a downstream turbine nozzle 200. It should be understood that any references made herein to pressure side walls and suction side walls are representative of particular embodiments, such references being made to facilitate discussion, and that such references are not intended to limit the scope of any embodiment, unless specific context dictates otherwise.

As shown collectively in FIGS. 3 and 4, each combustor nozzle 100 includes an inner liner 106, an outer liner 108, and a hollow or semi-hollow combustion liner 110 that extends between the inner liner 106 and the outer liner 108. It is contemplated that more than one (e.g., 2, 3, 4, or more) combustion liners 110 may be positioned between the inner liner 106 and the outer liner 108, thereby reducing the number of joints between adjacent liner that require sealing. For ease of discussion herein, reference will be made to integrated combustor nozzles 100 having a single combustion liner 110 between respective inner and outer liner 106, 108, although a 2:1 ratio of liner to combustion liners is not required. As shown in FIGS. 3 and 4, each combustion liner 110 includes forward or upstream end portion 112, an aft or downstream end portion 114, a pressure side wall 116, and a suction side wall 118.

The segmented annular combustion system 36 further includes a fuel injection module 117. In the illustrated example embodiment, the fuel injection module 117 includes a plurality of fuel nozzles. The fuel injection module 117 is configured for installation in the forward end portion 112 of a respective combustion liner 110. For purposes of illustration herein, the fuel injection module 117 including the plurality of fuel nozzles may be referred to as a "bundled tube fuel nozzle." However, the fuel injection module 117 may include or comprise any type of fuel nozzle or burner (such as a swirling fuel nozzle or swozzle), and the claims should be not limited to a bundled tube fuel nozzle unless specifically recited as such.

In at least one embodiment, as shown in FIGS. 3 and 4, the downstream end portion 114 of one or more of the combustion liners 110 transitions into a turbine nozzle 200 having an airfoil 202, which directs and accelerates the flow of combustion products toward the turbine blades. Thus, the downstream end portion 114 of each combustion liner 110 may be considered an airfoil without a leading edge. When the integrated combustor nozzles 100 are mounted within the combustion section 16, the turbine nozzle 200 may be positioned immediately upstream from a stage of turbine rotor blades of the turbine 18.

As used herein, the term "integrated combustor nozzle" refers to a seamless structure that includes the combustion liner 110, the turbine nozzle 200 downstream of the combustion liner 110, the inner liner 106 extending from the forward end 112 of the combustion liner 110 to the aft end 114 (embodied by the turbine nozzle 200), and the outer liner 108 extending from the forward end 112 of the combustion liner 110 to the aft end 114 (embodied by the turbine nozzle 200). In at least one embodiment, the turbine nozzle 200 of the integrated combustor nozzle 100 functions as a first-stage turbine nozzle and is positioned upstream from a first stage of turbine rotor blades.

Figure 5:
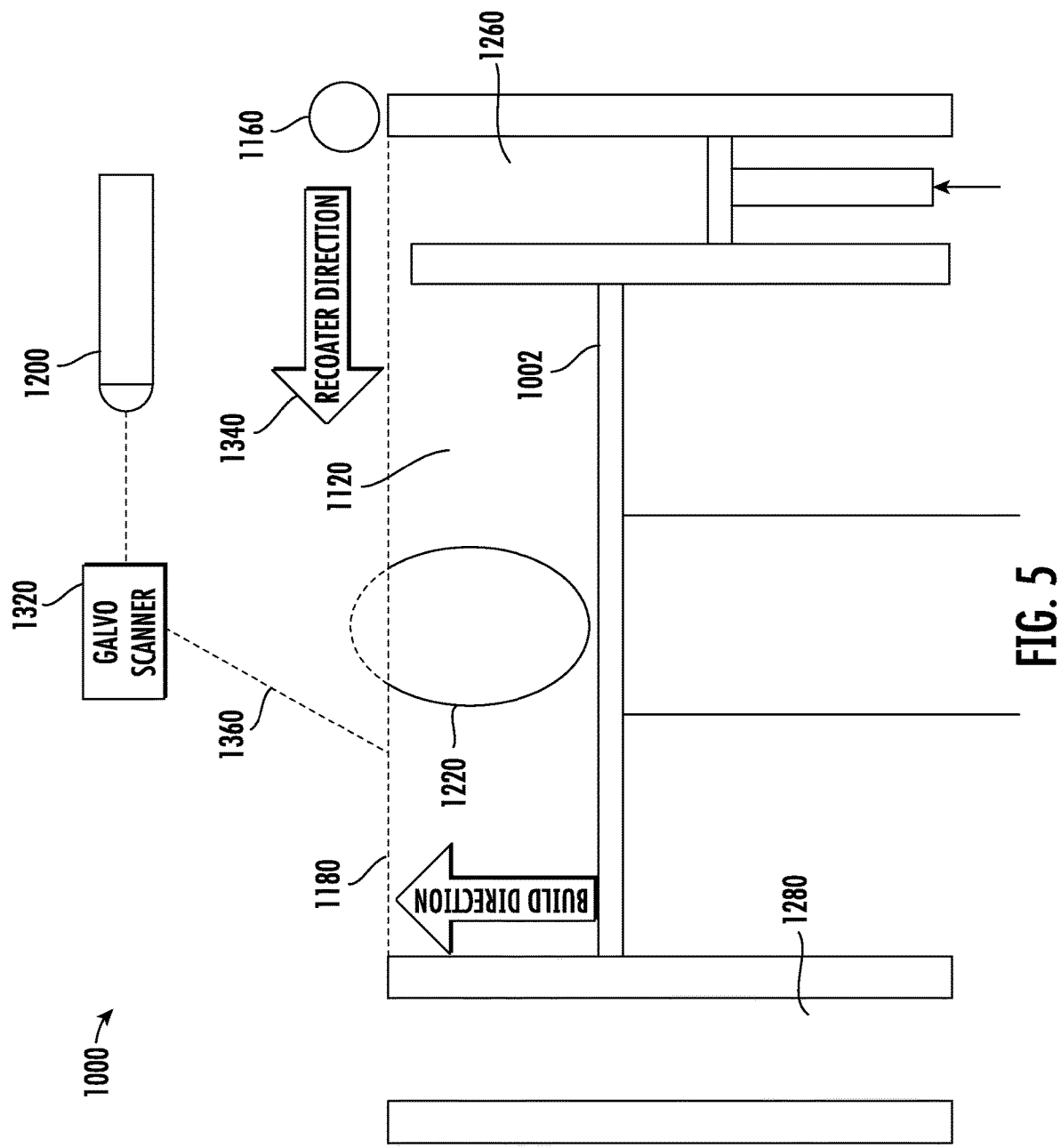
FIG. 5 is a schematic/block view of an additive manufacturing system for generating an object, in accordance with embodiments of the present disclosure.

To illustrate an example of an additive manufacturing system and process, FIG. 5 shows a schematic/block view of an additive manufacturing system 1000 for generating a turbomachine component 1220, such as the turbine nozzle 200 described herein. FIG. 5 may represent an additive manufacturing system configured for direct metal laser sintering (DMLS) or direct metal laser melting (DMLM). The additive manufacturing system 1000 fabricates objects, such as the turbine nozzle 200. For example, the object 1220 may be fabricated in a layer-by-layer manner by sintering or melting a powder material in a powder bed 1120 using an energy beam 1360 generated by a source such as a laser 1200. The powder to be melted by the energy beam is supplied by reservoir 1260 and spread evenly over a build plate 1002 using a recoater arm 1160, which moves in a rocoater direction 1340, to maintain the powder at a level 1180 and remove excess powder material extending above the powder level 1180 to waste container 1280. The energy beam 1360 sinters or melts a cross sectional layer of the object being built under control of the galvo scanner 1320. The build plate 1002 is lowered and another layer of powder is spread over the build plate and the object being built, followed by successive melting/sintering of the powder by the laser 1200. The process is repeated until the object 1220 is completely built up from the melted/sintered powder material. The laser 1200 may be controlled by a computer system including a processor and a memory. The computer system may determine a scan pattern for each layer and control laser 1200 to irradiate the powder material according to the scan pattern. After fabrication of the object 1220 is complete, various post-processing procedures may be applied to the object 1220. Post processing procedures include removal of excess powder by, for example, blowing or vacuuming. Other post processing procedures include a stress release process. Additionally, thermal and chemical post processing procedures can be used to finish the object 1220.

Figure 6:
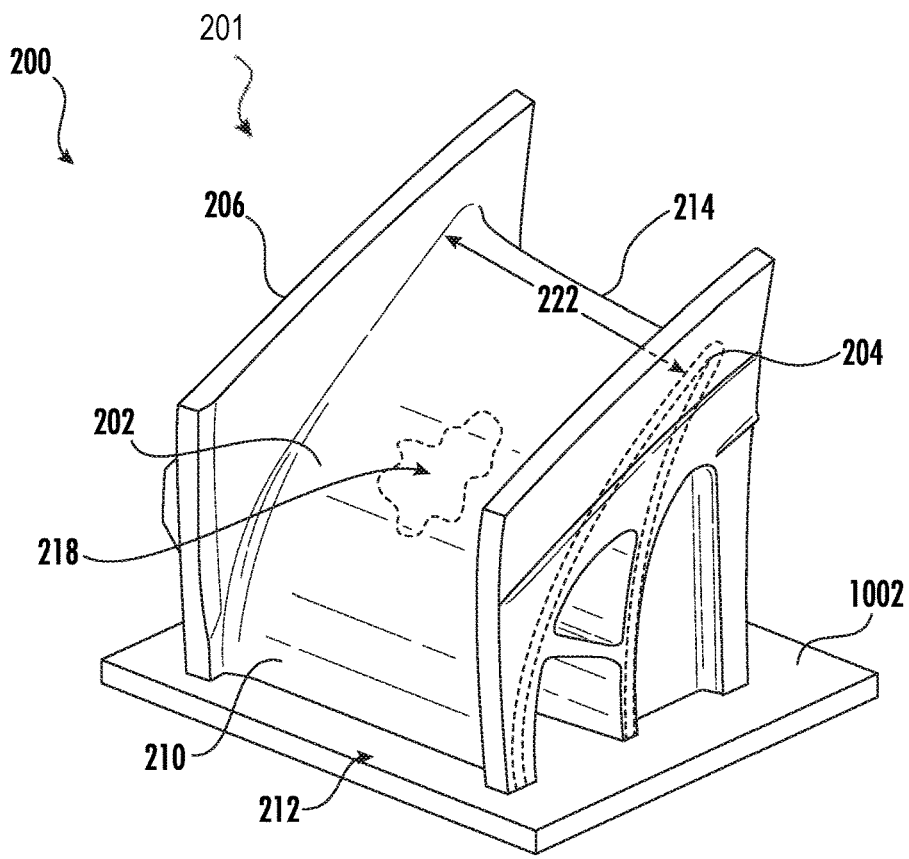
FIG. 6 illustrates a perspective view of a turbine nozzle, which is isolated from the various other components of the integrated combustor nozzle and positioned on a build plate, in accordance with embodiments of the present disclosure.
Figure 7:
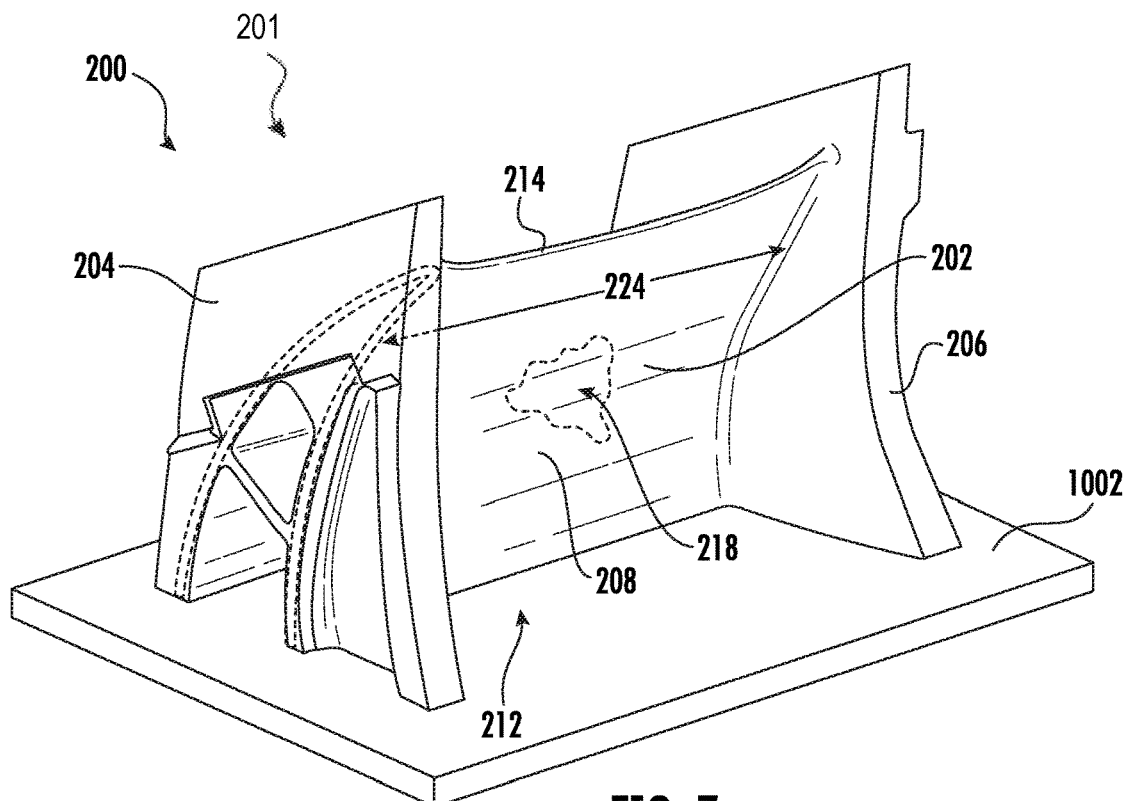
FIG. 7 illustrates a perspective view of a turbine nozzle, which is isolated from the various other components of the integrated combustor nozzle and positioned on a build plate, in accordance with embodiments of the present disclosure.

FIGS. 6 and 7 illustrate two different perspective views of a turbine nozzle assembly 201, which includes the turbine nozzle 200 and a plurality of heat fins 232 (FIG. 8) printed on a build plate 1002. The turbine nozzle assembly isolated from the various other components of the integrated combustor nozzle 100 and positioned on a build plate 1002. The turbine nozzle 200 may be additively manufactured on a build plate 1002, e.g., via the additive manufacturing system 1000. For example, FIGS. 6 and 7 depict the turbine nozzle 200 prior to removal from the build plate 1002 and installation on to the integrated combustor nozzle 100, in accordance with embodiments of the present disclosure.

As shown, the turbine nozzle 200 may include an airfoil 202 that extends from the build plate 1002. In many embodiments, the turbine nozzle may further include an inner liner segment 204 that is spaced apart from, and oppositely disposed from, an outer liner segment 206. As shown, the airfoil 202 may extend between the inner liner segment 204 and the outer liner segment 206. The airfoil 202 may have a generally aerodynamic contour, which directs and accelerates the flow of combustion products toward the turbine blades. For example, the airfoil 202 may have a pressure side wall 208 and a suction side wall 210, each of which extends between a forward end 212 of the airfoil and a trailing edge 214. As shown, the forward end 212 of the airfoil 202 may be fixedly coupled to the build plate 1002 during and immediately after the additive manufacturing process. As shown in FIGS. 3 and 4, when the turbine nozzle 200 is installed in the integrated combustion nozzle 100, the pressure side wall 208 may extend continuously with the pressure side wall 116 of the combustion liner 110, and the suction side wall 210 may extend continuously with the suction side wall of the combustion liner 110. Similarly, when the turbine nozzle 200 is installed in the integrated combustion nozzle 100, the inner liner segment 204 may extend continuously with the inner liner 106, and the outer liner segment 206 may extend continuously with the outer liner segment 108.

In many embodiments, the turbine nozzle 200 may include a one or more thermally sensitive portions 218 (as shown by the enclosed dashed line in FIGS. 6 and 7). The thermally sensitive portions 218 may be one or more regions of the turbine nozzle 200 that are prone to deformation and/or distortions caused by the high heat of the energy beam 1360 and the melting/sintering of the powder during the additive manufacturing process. For example, the thermally sensitive portions 218 of the turbine nozzle 200 may not have a direct path between the portion 218 and the build plate 1002, such that the heat from the melting/sintering of the powder has nowhere to travel and/or dissipate. In this way, the thermally sensitive portions 218 of the turbine nozzle 200 may be susceptible to deformations and/or distortions caused by thermal stresses induced during the additive manufacturing process if the heat is not properly transferred.

In many embodiments, the both the pressure side wall 208 and the suction side wall 210 of the airfoil 202 may define a thermally sensitive portion 218. In particular embodiments, the thermally sensitive portion 218 may be disposed solely on the suction side wall 208. As discussed below, the pressure side wall 208 and the suction side wall 210 of the airfoil 202 may each have a very small thickness 228, 230 to width 224, 222 ratio and thickness 228, 230 to height 226 ratio, i.e., the height 226 and width 224, 222 of the walls 208, 210 may be many times larger than the thickness 228, 230. In this way, the walls 208, 210 are generally thin and therefore more susceptible to deformations caused by thermal stresses during the additive manufacturing process.

For example, in many embodiments, the pressure side wall 208 may include a thickness 228 to width 224 ratio of between about 1% and about 10%. In other embodiments, the pressure side wall may include a thickness 228 to width 224 ratio of between about 1% and about 8%. In various embodiments, the pressure side wall may include a thickness 228 to width 224 ratio of between about 1% and about 5%. In exemplary embodiments, the pressure side wall may include a thickness 228 to width 224 ratio of between about 2% and about 4%. Similarly, the suction side wall 210 may include a thickness 230 to width 222 ratio of between about 1% and about 10%. In other embodiments, the suction side wall 210 may include a thickness 230 to width 222 ratio of between about 1% and about 8%. In various embodiments, the suction side wall 210 may include a thickness 230 to width 222 ratio of between about 1% and about 5%. In exemplary embodiments, the suction side wall 210 may include a thickness 230 to width 222 ratio of between about 2% and about 4%.

Likewise, in many embodiments, the pressure side wall 208 and the suction side wall 210 may each include a thickness 228, 230 to height 226 ratio of between about 0.5% and about 10%. In other embodiments, the pressure side wall 208 and the suction side wall 210 may each include a thickness 228, 230 to height 226 ratio of between about 0.5% and about 7%. In various embodiments, the pressure side wall 208 and the suction side wall 210 may each include a thickness 228, 230 to height 226 ratio of between about 0.7% and about 5%. In exemplary embodiments, the pressure side wall 208 and the suction side wall 210 may each include a thickness 228, 230 to height 226 ratio of between about 1% and about 3%.

Figure 8:
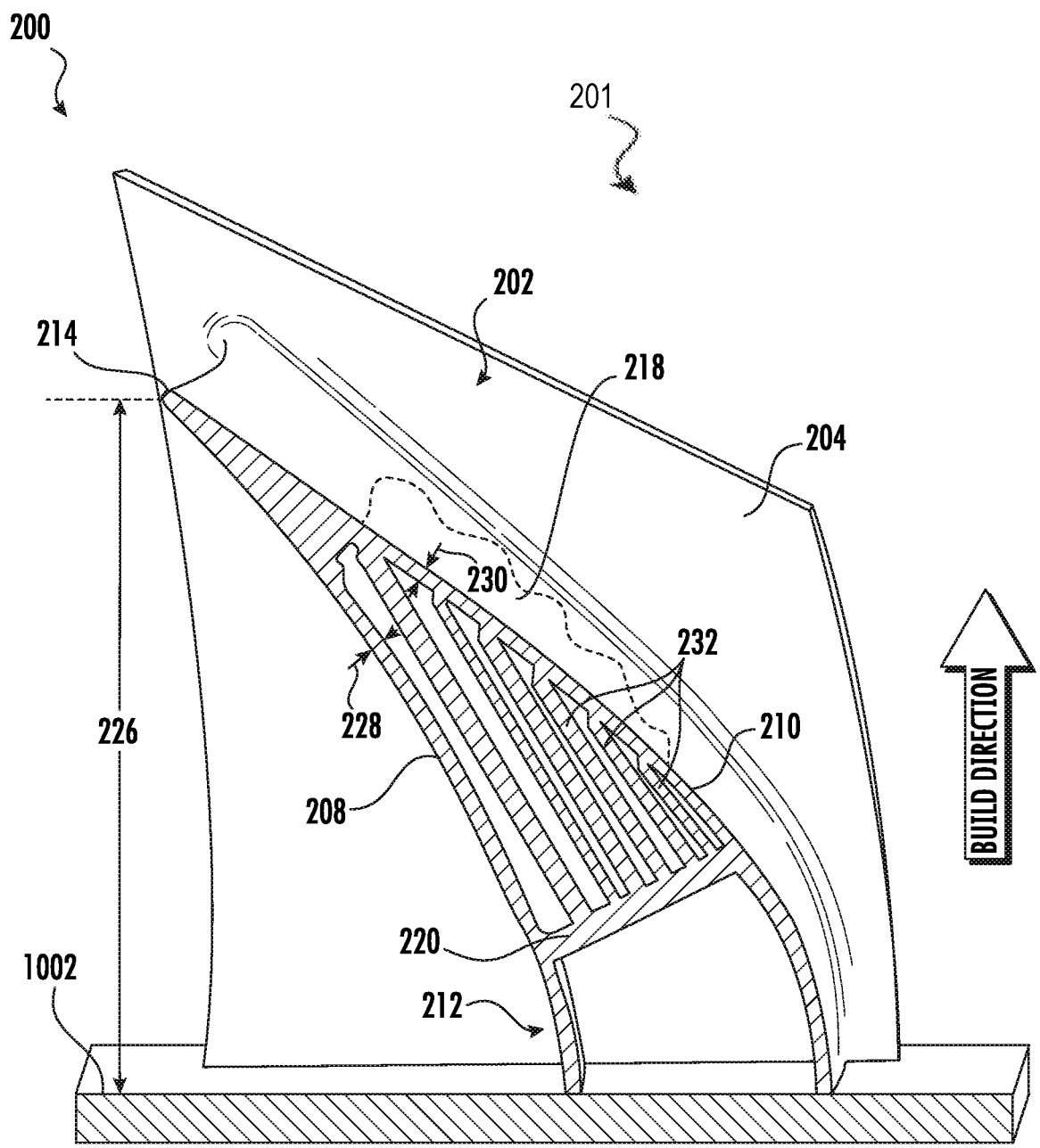
FIG. 8 illustrates a cross-sectional view of a turbine nozzle, which is isolated from the various other components of the integrated combustor nozzle and positioned on a build plate, in accordance with embodiments of the present disclosure.

FIG. 8 illustrates a cross sectional view of a turbine nozzle 200 prior to removal from the build plate 1002. As shown in FIG. 8 the turbine nozzle 200 may include a rib 220 that extends between the pressure side wall 208 to the suction side wall 210 and between the inner liner segment 204 and the outer liner segment 206. In many embodiments, the rib 220 may be generally perpendicular to both the pressure side wall 208 and the suction side wall 210. The rib 220 may function to provide additional structural support to the airfoil 202, in order to prevent damage to the airfoil caused by the vibrational forces of the gas turbine 10 during operation thereof. a plurality of heat fins are configured to transfer heat away from a thermally sensitive portion of the airfoil during the additive manufacturing process.

As shown in FIG. 8, the turbine nozzle assembly 201 may include a turbine nozzle 200 and a plurality of heat fins 232. The plurality of heat fins 232 may be disposed within the turbine nozzle 200. For example, the plurality of heat fins 232 may extend between the thermally sensitive portion 218 and the rib 220, in order to direct heat away from the thermally sensitive portion 218 during the additive manufacturing process, thereby advantageously minimizing and/or preventing deformations or distortions to the thermally sensitive portion 218. For example, in exemplary embodiments, each heat fin 232 of the plurality of heat fins 232 may extend directly from the suction side wall 210 to the rib 220, such that they provide a means for the heat from the post-sintered or post-melted powder to travel from the suction side wall 210. In such embodiments, the plurality of heat fins 232 may indirectly transfer heat from the thermally sensitive portion 218 to the build plate 1002. In other embodiments (not shown), each heat fin 232 of the plurality of heat fins 232 may extend directly from the suction side wall 210 to the build plate 1002, such that the plurality of heat fins 232 may directly transfer heat from the thermally sensitive portion 218 to the build plate 1002.

In many embodiments, as shown in FIG. 8, the plurality of heat fins 232 may be arranged in linear rows that are spaced apart from one another between the pressure side wall 208 and the suction side wall 210, which advantageously provides for heat transfer along the entire thermally sensitive portion 218 during the additive manufacturing process. As shown, exemplary embodiments, the plurality of heat fins 232 may be arranged in six linear rows, each row spaced apart from a neighboring row of heat fins. However, in other embodiments, the plurality of heat fins may be arranged in more or less linear rows, depending on the size of the suction side wall 210. In various embodiments (not shown), the plurality of heat fins may be spaced apart from each other in a width-wise direction (along the width 222, 224 of the walls 208, 210). For example, the plurality of heat fins 232 shown in FIG. 8 may be spaced apart from neighboring heat fins in the width-wise direction of the wall (into and out of the page on FIG. 8).

In some embodiments, the plurality of heat fins 232 may provide structural support to the airfoil 202 during the fabrication thereof. For example, in addition to providing a means for heat to be transferred during the additive manufacturing of the turbine nozzle 200, each of the heat fins 232 may provide structural support to various portions of the airfoil 202, such as the suction side wall 210 and/or the pressure side wall 208. In this way, the heat fins 232 may advantageously prevent overhanging material during the additive manufacturing process, which could otherwise cause distortions and/or a total collapse of the component. However, in other embodiments, the heat fins 232 may only function to provide a means of heat transfer from the thermally sensitive portion 218 to the build plate 1002.

Figure 9:
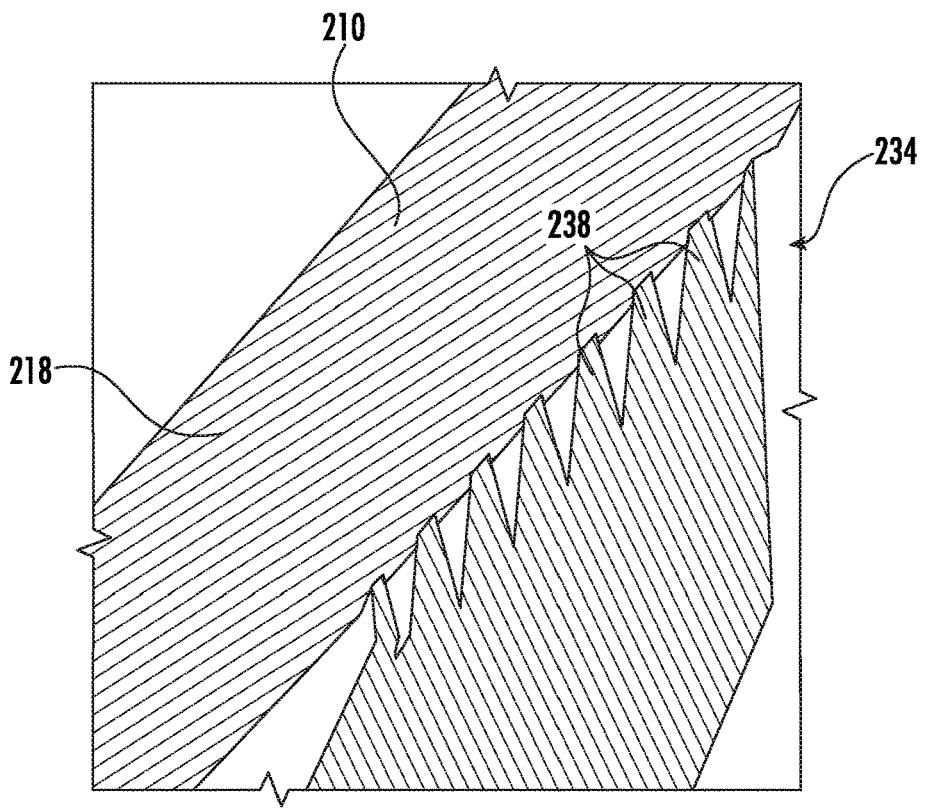
FIG. 9 illustrates a first toothed end of a heat fin, in accordance with embodiments of the present disclosure.
Figure 10:
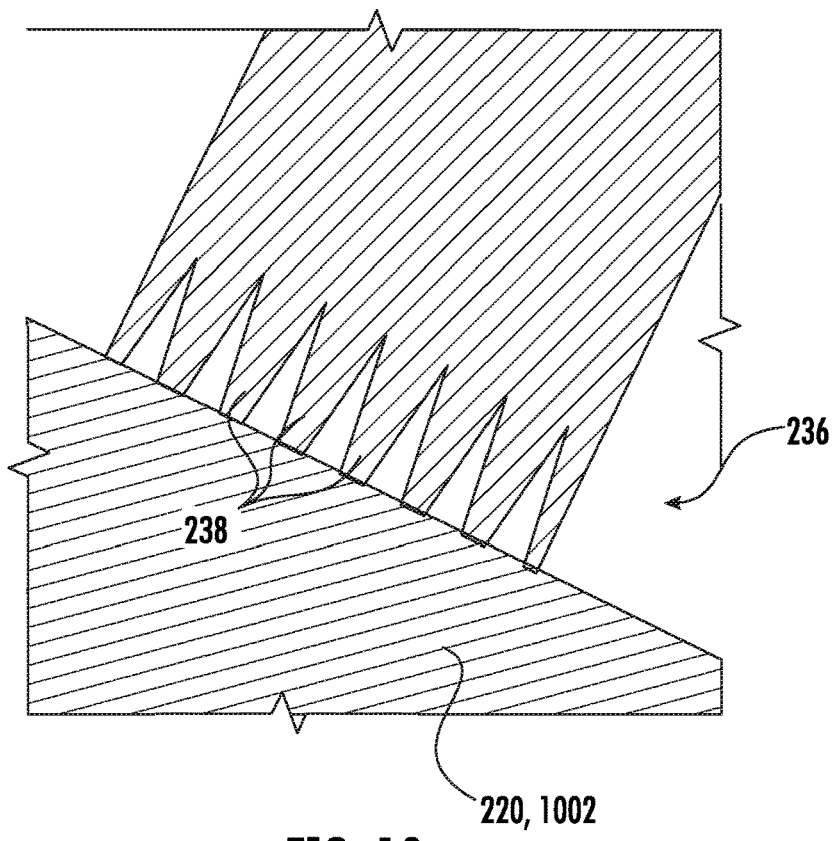
FIG. 10 illustrates a second toothed end of a heat fin, in accordance with embodiments of the present disclosure.

FIG. 9 illustrates a first toothed end 234 of one of the heat fins 232 of the plurality of heat fins 232, and FIG. 10 illustrates a second toothed end 236 of one of the heat fins 232 of the plurality of heat fins 232, in accordance with embodiments of the present disclosure. As shown, the first toothed 234 end may be fusedly connected to the thermally sensitive portion 218 of the airfoil 202, such as a portion of the suction side wall 210. Similarly, the second toothed end 236 may be fusedly connected to one of a second portion of the airfoil 202 or the build plate 1002. For example, in exemplary embodiments the second toothed end 236 may be fusedly connected to the rib 220. As shown, both the first toothed end 234 and the second toothed end 236 may include teeth 238 that extend from the heat fin 232 and are spaced apart from one another, which advantageously allows less of a coupling force between the heat fin 232 and the airfoil 202. In this way, the toothed ends 234, 236 advantageously facilitate the removal of the heat fins 232 after completion of the additive manufacturing process. In many embodiments the toothed ends 234, 236 allow the heat fins 232 to be readily broken away once the additive manufacturing process is complete.

Figure 11:
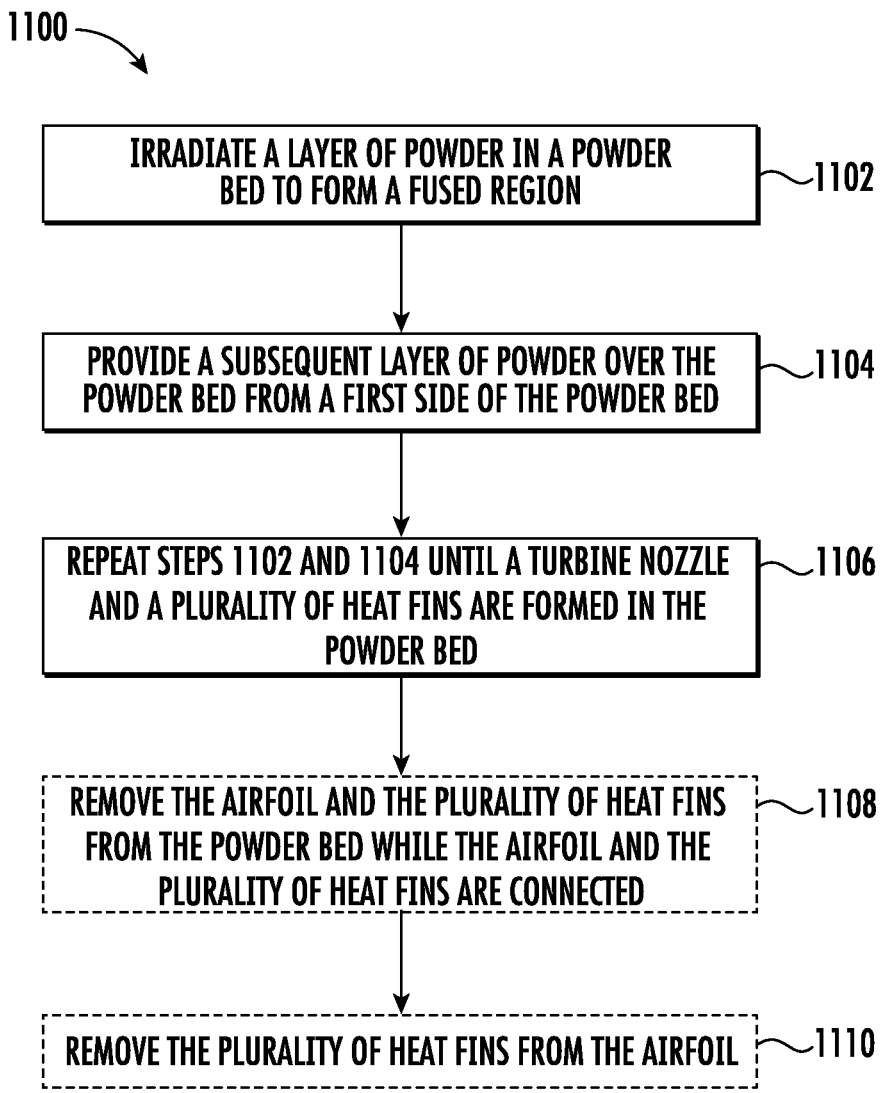
FIG. 11 is a flow chart a method for fabricating a turbine nozzle, in accordance with embodiments of the present disclosure.

FIG. 11 is a flow chart of a sequential set of steps 1102 through 1106, which define a method 1100 of fabricating a turbine nozzle 200 for a turbomachine using an additive manufacturing system, in accordance with embodiments of the present disclosure. The method 1100 may be performed using an additive manufacturing system, such as the additive manufacturing system 1000 described herein or another suitable system. As shown in FIG. 11, the method 1100 includes a step 1102 of irradiating a layer of powder in a powder bed 1120 to form a fused region. In many embodiments, as shown in FIG. 5, the powder bed 1120 may be disposed on the build plate 1002, such that the fused region is fixedly attached to the build plate 1002. The method 1100 may include a step 1104 of providing a subsequent layer of powder over the powder bed 1120 from a first side of the powder bed 1120. The method 1100 further includes a step 1106 of repeating steps 1102 and 1104 until the turbine nozzle 200 and a plurality of heat fins 232 are formed in the powder bed 1120. As discussed above, the plurality of heat fins 232 advantageously transfer heat away from a thermally sensitive 218 portion of the airfoil 202, thereby preventing any deformations and/or distortions to the thermally sensitive portion 218. In this way, the heat fins 232 allow the turbine nozzle 200 to be manufactured using an additive manufacturing system 1000 with minimal or no defects. As shown in FIG. 11, the method 1100 may further include an optional step 1108 of Removing the airfoil 202 and the plurality of fins 232 from the powder bed 1120 while the airfoil 202 and the plurality of fins 232 are connected, e.g., removing the turbine nozzle assembly 201 from the build plate 1002. Further, in many embodiments, the method 1100 may further include an optional step 1110 of removing the plurality of heat fins from the airfoil 202. For example, once the turbine nozzle assembly 201 is removed from the build plate 1002, the plurality of heat fins 232 may be removed from the turbine nozzle assembly 201, thereby forming the finished turbine nozzle 200.

The removal of the heat fins 232 from the airfoil 202 may take place immediately upon, or during, removal of the turbine nozzle 200 from the powder bed 1120. Alternatively, the plurality of heat fins 232 may be removed after one or more post-treatment steps is performed to the turbine nozzle 200. For example, the turbine nozzle 200 and heat fins 232 may be subjected to a post-anneal treatment and/or chemical treatment and then subsequently removed from the turbine nozzle 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of fabricating a turbine nozzle for a turbomachine using an additive manufacturing system, the method comprising:
   irradiating a layer of powder in a powder bed to form a fused region, wherein the powder is disposed on a build plate;
   providing a subsequent layer of powder over the powder bed by passing a recoater arm over the powder bed from a first side of the powder bed; and
   repeating the irradiating and providing steps until a turbine nozzle assembly is formed on the build plate, the turbine nozzle assembly including the turbine nozzle and a plurality of heat fins disposed within the turbine nozzle, wherein the plurality of heat fins transfer heat away from a thermally sensitive portion of the turbine nozzle directly to the build plate during the irradiating and providing steps.

2. The method as in claim 1, wherein the turbine nozzle includes an airfoil that extends between an outer liner segment and an inner liner segment, and wherein the airfoil comprises a forward portion fused to the build plate, a trailing edge, a pressure side wall and a suction side wall extending between the forward portion and the trailing edge.

3. The method as in claim 2, wherein the thermally sensitive portion of the airfoil is a portion of the suction side wall.

4. The method as in claim 2, wherein the pressure side wall and the suction side wall each comprise a thickness, a width defined between the outer liner segment and the inner liner segment, and a thickness to width ratio between about 1% and about 10%.

5. The method as in claim 2, wherein the pressure side wall and the suction side wall each comprise a thickness, a height defined between the build plate and the trailing edge, and a thickness to height ratio between about 0.5% and about 10%.

6. The method of claim 1, further comprising removing the turbine nozzle assembly from the build plate while the turbine nozzle and the plurality of heat fins are connected.

7. The method of claim 6, further comprising removing the plurality of heat fins from the turbine nozzle assembly.

8. The method as in claim 1, wherein each heat fin of the plurality of heat fins includes a first toothed end that is fusedly connected to the thermally sensitive portion of the turbine nozzle and a second toothed end that is fusedly connected to one of a second portion of the turbine nozzle or the build plate.

9. The method as in claim 1, wherein the plurality of heat fins provides structural support to the turbine nozzle during the irradiating and providing steps.

10. The method of claim 1, wherein the method is performed using direct metal laser sintering or direct metal laser melting.

11. A method of fabricating a turbine nozzle for a turbomachine using an additive manufacturing system, the method comprising:
    irradiating a layer of powder in a powder bed to form a fused region, wherein the powder is disposed on a build plate;
    providing a subsequent layer of powder over the powder bed by passing a recoater arm over the powder bed from a first side of the powder bed;
    repeating the irradiating and providing steps until a turbine nozzle assembly is formed on the build plate, the turbine nozzle assembly including the turbine nozzle and a plurality of heat fins disposed within the turbine nozzle, wherein the plurality of heat fins transfer heat away from a thermally sensitive portion of the turbine nozzle;
    removing the turbine nozzle assembly from the build plate while the turbine nozzle and the plurality of heat fins are connected; and
    removing the plurality of heat fins from the turbine nozzle assembly.

12. The method as in claim 11, wherein the turbine nozzle includes an airfoil that extends between an outer liner segment and an inner liner segment, and wherein the airfoil comprises a forward portion fused to the build plate, a trailing edge, a pressure side wall and a suction side wall extending between the forward portion and the trailing edge.

13. The method as in claim 12, wherein the thermally sensitive portion of the airfoil is a portion of the suction side wall.

14. The method as in claim 12, wherein the pressure side wall and the suction side wall each comprise a thickness, a width defined between the outer liner segment and the inner liner segment, and a thickness to width ratio between about 1% and about 10%.

15. The method as in claim 12, wherein the pressure side wall and the suction side wall each comprise a thickness, a height defined between the build plate and the trailing edge, and a thickness to height ratio between about 0.5% and about 10%.

16. The method as in claim 11, wherein the plurality of heat fins transfer heat from the thermally sensitive portion of the turbine nozzle indirectly to the build plate during the irradiating and providing steps.

17. The method as in claim 11, wherein each heat fin of the plurality of heat fins includes a first toothed end that is fusedly connected to the thermally sensitive portion of the turbine nozzle and a second toothed end that is fusedly connected to one of a second portion of the turbine nozzle or the build plate.

18. A method of fabricating a turbine nozzle for a turbomachine using an additive manufacturing system, the method comprising:

irradiating a layer of powder in a powder bed to form a fused region, wherein the powder is disposed on a build plate;

providing a subsequent layer of powder over the powder bed by passing a recoater arm over the powder bed from a first side of the powder bed; and repeating the irradiating and providing steps until a turbine nozzle assembly is formed on the build plate, the turbine nozzle assembly including the turbine nozzle and a plurality of heat fins disposed within the turbine nozzle, wherein the plurality of heat fins transfer heat away from a thermally sensitive portion of the turbine nozzle, wherein each heat fin of the plurality of heat fins includes a first toothed end that is fusedly connected to the thermally sensitive portion of the turbine nozzle and a second toothed end that is fusedly connected to one of a second portion of the turbine nozzle or the build plate.

\* \* \* \* \*